Aug. 13, 1935.  E. L. KRAFT  2,011,056
WINDSHIELD FOR AUTOMOBILES
Filed Sept. 2, 1931  2 Sheets-Sheet 1
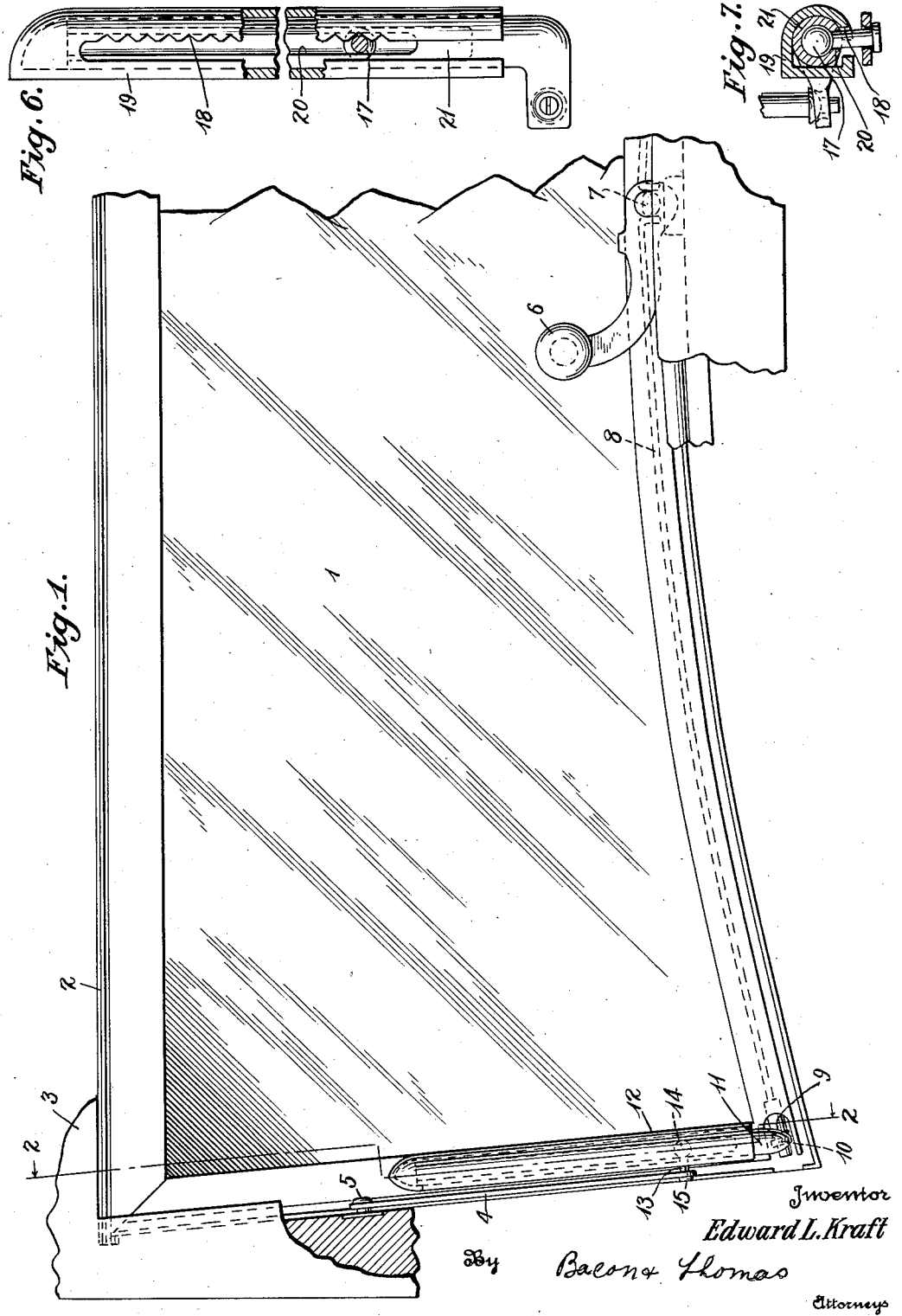
Inventor
Edward L. Kraft
By Bacon & Thomas
Attorneys Aug. 13, 1935. E. L. KRAFT 2,011,056
WINDSHIELD FOR AUTOMOBILES
Filed Sept. 2, 1931 2 Sheets-Sheet 2
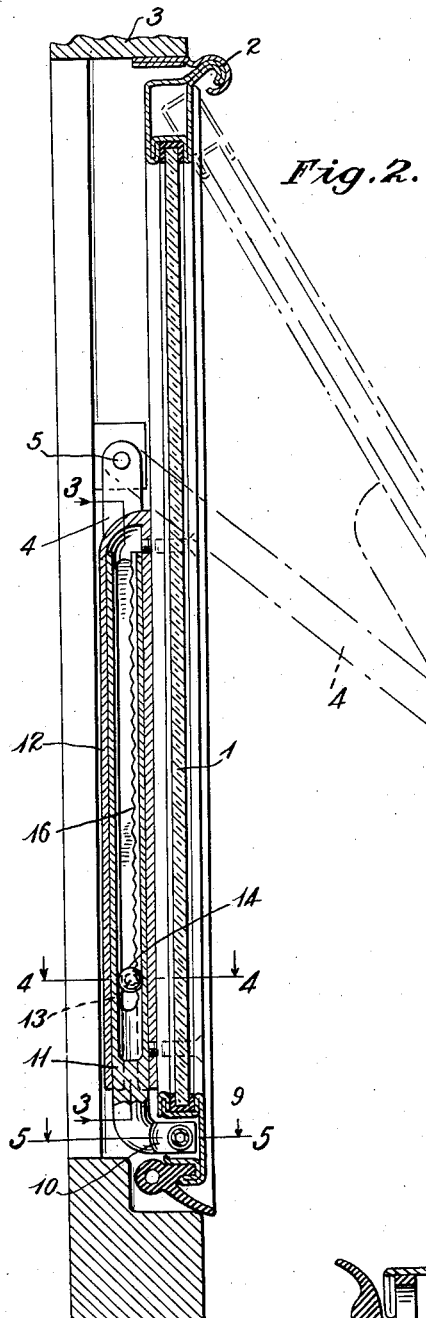
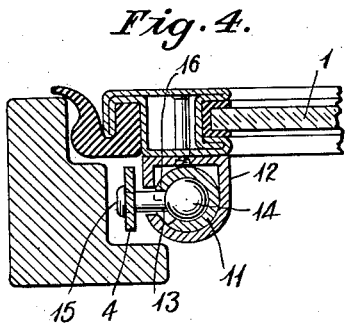
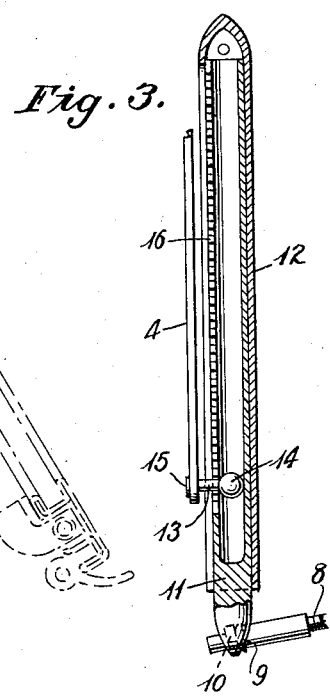
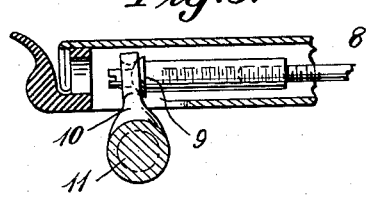
Inventor
Edward L. Kraft
By Bacon + Thomas
Attorneys Patented Aug. 13, 1935

2,011,056

UNITED STATES PATENT OFFICE 2,011,056

WINDSHIELD FOR AUTOMOBILES

Edward L. Kraft, York, Pa., assignor to Martin-Parry Corporation, York, Pa., a corporation of Delaware Application September 2, 1931, Serial No. 560,810

3 Claims. (Cl. 296—84)

This invention relates to controlling mechanism for windshields and is a structural improvement upon the idea disclosed and broadly claimed in the Beitman application, Serial No. 386,780, filed August 19, 1929.

The object of the present invention is to provide a clamping or securing mechanism for adjusting the windshield in any desired position which is positive in action and does not rely upon friction.

Another object of the invention is to provide an inexpensive assemblage which may be applied to windshields of various kinds and which overcomes the possibility of slippage when traversing rough roads at high speeds.

A still further object of the invention is to provide means for enclosing the various controlling apparatus from view and so constructed that the operator with one hand, while driving the car with the other, may adjust the shield and lock it without difficulty.

Other objects of the invention will be apparent from a reading of the following specification in conjunction with the drawings attached hereto and forming a part hereof in which Fig. 1 represents an elevational view of a portion of the shield;

Fig. 2 represents a longitudinal sectional view taken on line 2—2 of Fig. 1 showing different positions of adjustment of the shield;

Fig. 3 is a detail sectional view of the bracket and rack taken on line 3—3 of Fig. 2;

Fig. 4 is a detail cross sectional view on line 4—4 of Fig. 2;

Fig. 5 is a detail sectional view on line 5—5 of Fig. 2;

Fig. 6 is a side elevation of a modified form of clamping mechanism; and

Fig. 7 is a sectional view of the structure shown in Fig 6.

Referring now more specifically to the drawings, 1 represents a windshield of the modern type adapted for outward movement and hinged at its upper end, as at 2, to the windshield frame 3. One or more bracing arms 4 are provided hinged to the windshield frame as at 5 and slidably connected and movable in accordance with the swinging movements of the shield at the other end thereof.

The control mechanism includes a handle 6 having a cam 7 actuating one or more longitudinally disposed push rods 8 connected as at 9 to the crank 10 provided by the lower extremity of the rotatable locking tube 11.

Along one or both of the vertical sides of the windshield is a channel shaped housing or bracket 12 in which is received the locking tube 11 aforesaid. The locking tube has a lateral opening slot extending vertically thereof, and the bracket 12 also has a lateral opening vertically extending slot as shown particularly in Fig. 4.

The lower end of the brace arm 4 is provided with a rivet 13 having a ball or spherical end 14 and rotatably secured to the bracing arm as at 15. The ball snugly fits within the confines of the rotatable lock tube and the shank of the rivet extends through the slots provided by the tube and by the bracket housing respectively. The locking tube at one edge of the slot has a series of teeth 16 as clearly shown in Fig. 3.

The operation of the device is as follows: When it is desired to adjust the shield, the handle 6 is rotated to thereby move the push rod 8 and impart a corresponding rotative movement to the locking tube 11 until the slot thereof alines with the slot of the bracket housing 12 and the shank of the rivet 13 is disengaged from the rack teeth 16. When in that position, the shield can be moved up and down with the brace arm and the connecting rivet 13 slides freely within the locking tube. When the desired open position is obtained, the said handle is pushed down which causes a rotation of the locking tube 11 until it tightly engages the rivet with one of the teeth provided by the rack on the said locking tube. In that position the shield is positively clamped.

It will be observed that the spherical end 14 permits the free rocking movement of the tube 11 to and from its engagement with the rivet 13.

In Figs. 6 and 7 there is illustrated a modified form of control structure which includes a channel shaped housing or bracket 19 within which is positioned the locking tube 21. The housing and tube are provided with longitudinally extending slots, as described in connection with the preceding structure, but in this modification, the teeth 18 are formed in an edge of the slot in the housing or bracket 19. The element 17 is formed with a ball shaped head which snugly fits within the bore or the locking tube 21 and has its shank extending through the slots of the two telescopically arranged members 19 and 21.

During the operation of this modified structure, movement of the handle 6 will cause reciprocation of the rod 8 for rotating the tube 21. The movement of the tube will cause a corresponding movement of the element 17 to shift the shank of the rivet into or out of the notches formed by the teeth 18 in the housing or bracket 19.

There is of course, as shown in Fig. 7, a loose connection between the end of the so-called rivet and the brace arm so that lateral movement of the rivet is permitted.

What I claim as new is:

1. In combination, a windshield frame, a windshield swingingly mounted therein, a bracket housing secured to the frame, a locking tube located within the housing, bracing means pivoted at one end to the windshield frame and being provided at the other end with a rocking lever having a spherical head located within the locking tube, means for rotating the locking tube to bind the rocking lever and restrain it from longitudinal sliding movement relative to the shield when the shield has been adjusted to its desired position.

2. In combination, a windshield frame, a windshield swingingly mounted therein, a channel housing secured to said windshield and having a slot extending laterally thereof, a locking tube located within the channel and being provided with a slot, a rocking arm universally mounted within the tube for sliding movement during the adjustment of the shield, bracing means secured to the windshield frame at one end and being connected with said rocking arm at the other end, and means for rotating said tube to laterally move said rocking arm into binding engagement to restrain its movement when the shield has reached its adjusted position.

3. In combination, a windshield frame, a windshield pivotally mounted in the frame, a bracing element pivotally connected to the frame, and a slidable, interlocking connection between the bracing element and the windshield, said slidable interlocking connection comprising a housing member having a longitudinal slot secured to the windshield, a locking tube member having a longitudinal slot rotatably received within said housing member, one edge of said longitudinal slot in one of said members having a series of teeth formed therein, and a pin carried by the bracing element and having a large head received within the bore of the locking tube with the shank of the pin received within said slots and adapted to engage said teeth to prevent movement of the pin longitudinally of the locking tube when the tube is rotated relative to the housing.

EDWARD L. KRAFT.